United States Patent [19]

Stewart et al.

[11] 4,323,300
[45] Apr. 6, 1982

[54] OPTICAL FIBRE CONNECTORS

[75] Inventors: William J. Stewart, Fritwell; John A. Robinson; Richard Carpenter, both of Northampton, England

[73] Assignee: Plessey Handel und Investments AG, Zug, Switzerland

[21] Appl. No.: 106,040

[22] Filed: Dec. 21, 1979

[30] Foreign Application Priority Data

Dec. 16, 1978 [GB] United Kingdom .............. 48828/78

[51] Int. Cl.³ ............................................. G02B 7/26
[52] U.S. Cl. ................................................ 350/96.21
[58] Field of Search ............... 350/96.20, 96.21, 96.22

[56] References Cited

U.S. PATENT DOCUMENTS

| | | | |
|---|---|---|---|
| 4,184,742 | 1/1980 | Corrales | 350/96.21 |
| 4,213,671 | 7/1980 | Lambert | 350/96.21 |
| 4,214,812 | 7/1980 | de Mendez | 350/96.21 |
| 4,245,887 | 1/1981 | Johnson | 350/96.21 |

FOREIGN PATENT DOCUMENTS

| | | |
|---|---|---|
| 2803570 | 8/1979 | Fed. Rep. of Germany ... 350/96.21 |
| 54-100746 | 8/1979 | Japan ................................. 350/96.21 |
| 1452474 | 10/1976 | United Kingdom . |
| 1475192 | 6/1977 | United Kingdom . |
| 1493690 | 11/1977 | United Kingdom . |
| 1499940 | 2/1978 | United Kingdom . |

*Primary Examiner*—John D. Lee
*Attorney, Agent, or Firm*—Fleit & Jacobson

[57] ABSTRACT

It is important that in an optical fibre connector the ends of the fibres should contact or very nearly contact to avoid excessive optical losses. They must be accurately aligned and lateral movements, causing varying optical output, be minimized. In this invention, the fibre or fibres are secured in grooves formed in flat surfaces in two abutting blocks and the blocks are clamped together with their flat surfaces in contact with a further flat surfaced member. The clamp consists of a cam surface formed in a housing which is adapted to contact a portion of the further member when the blocks are introduced into the housing.

5 Claims, 5 Drawing Figures

OPTICAL FIBRE CONNECTORS

This invention relates to optical fibre connectors.

One known type of optical fibre connector consists basically of two abutting blocks in each of which is formed a V-groove, the V-grooves supporting optical fibres. To align the grooves additional deeper grooves are provided to hold alignment pins. All the grooves in one block, are closely in register to the corresponding grooves in the other block, so that in the case of a multi-fibre connector, for example, the alignment of two pairs of grooves with two pins is normally sufficient to ensure accurate registration of all the grooves and their associated fibres. In a practical connector, the blocks are each supported within a housing or shell; the assembly of the two shells, via a fixing screw, for example, causes mating of the blocks.

The alignment pins are usually fixed in one of the blocks and gripped with some form of spring biasing adjacent to the grooves in the other block to give a demountable assembly. Hence the pins slide in the grooves in the latter block, as the blocks are connected or parted. In addition, the blocks may be spring urged together to avoid introducing relative strain between them, which could occur otherwise through small mechanical misalignments existing between the shells and the blocks.

In this arrangement there is the requirement to balance two spring actions, one urging the blocks together and one acting on the alignment pins.

In particular, too high a force on the pins can prevent the blocks from properly contacting, leading to excessive optical losses; too low a force can lead to relative movement and consequent varying optical output particularly if the connector is subjected to mechanical vibration. Additionally, as the grooves are usually formed in a soft material, excessive groove wear can occur when the spring force acting on the alignment pins is increased.

It is an object of the present invention to provide an optical fibre connector of this type which will overcome or substantially overcome these problems.

According to the present invention an optical fibre connector comprises a first member having a first flat surface formed thereon, a groove formed in the first flat surface adapted to receive an optical fibre extending along the length of the groove, a second member having a second flat surface formed thereon, a groove formed in the second flat surface adapted to receive an optical fibre extending along the length of the groove, the two members being adapted to be aligned together with the first and second flat surfaces lying in the same plane and a third member having a cam surface which together with a cam form means for aligning the first and second members together whereby the first and second surfaces lie in the same plane and the ends of the optical fibres are in contact or are adjacent to each other.

Preferably, the third member is secured to the first member.

Preferably, the optical fibres in the first and second members are secured in the grooves by plates clamped to the surfaces or by the use of suitable adhesives.

Preferably the first and second members are aligned by pins secured in further grooves formed in the first surface, the pins being adapted to locate in corresponding grooves formed in the second surface.

Means for clamping the first and second members together are preferably provided and preferably comprise a cam surface integral with the third member and preferably attached to the first member together with a cam preferably attached to the second member or a shell housing the second member.

The first and second members are preferably mounted in housings, at least one being provided with means for retaining the member therein. Preferably the housings are provided also with means for coupling and uncoupling.

Preferably the second member is moveable relative to its housing against resilient or partially resilient means.

An embodiment of the invention will now be described by way of example only with reference to the accompanying drawings in which:

FIG. 1 in a cross-sectional view of an optical fibre connector in accordance with the invention.

Figure 1:
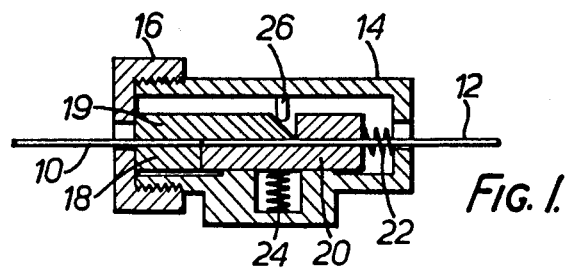

The optical fibre connector, shown in FIG. 1, for joining two optical fibres 10, 12 comprises basically housings 14 and 16, adapted to be assembled together by a screw thread, two blocks 18 and 20 and a third block 19. The block 20 is urged by a spring 22 in the left-hand direction on the drawing and in an upward direction by a spring 24. A spigot 26 is rigidly secured inside the housing 14, the purpose of the spigot 26, and the springs 22 and 24 being described later.

Figure 2:
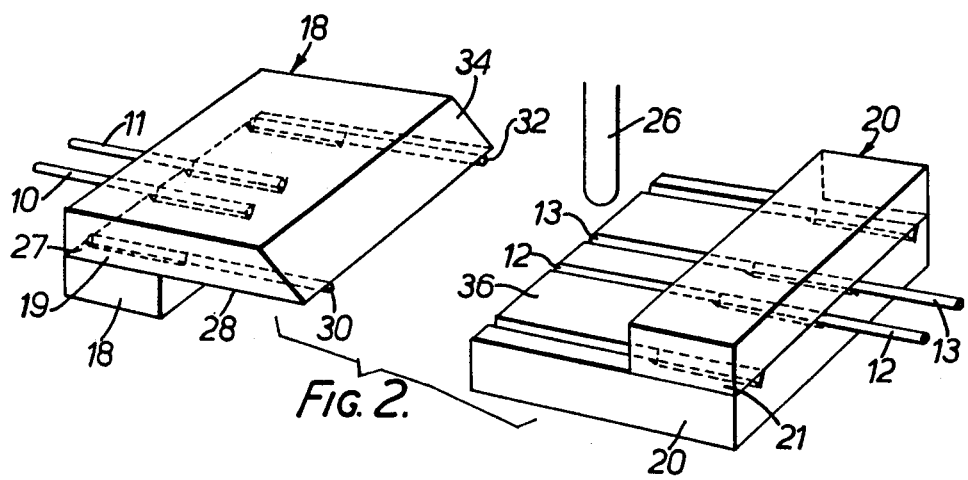
FIG. 2 is a perspective view of two blocks forming part of the connector.

The blocks 18 and 20 are shown in more detail in FIG. 2, although in this case the blocks are for connecting two pairs of optical fibres 10, 12 and 11, 13.

The block 18 has an upper surface 27 in which are formed four V-grooves. The optical fibres 10, 11 are located in the two inner V-grooves, and two alignment pins 30, 32 are located in the two outer V-grooves, the latter grooves being somewhat larger to accomodate the larger diameters of the alignment pins. The pins 30 and 32 and the optical fibres 10 and 11 are held in place in the V-grooves by a block 19, the block being secured to the surface 27 by suitable means such as screws (not shown). The optical fibres 10 and 11 extend over the full length of their respective grooves terminating at the end of the block 18 while the alignment pins 30 and 32 extend beyond the end of the block 18. The upper surface of the block 19 is formed with an inclined plane 34.

The block 20 has formed on its upper surface 36 (as viewed in the drawings) four V-grooves, the two inner grooves having optical fibres 12 and 13 located therein and held in position by a plate 21. The plate 21 is secured to the part 20, again by screws (not shown). In this case the optical fibres extend to the end of the surface 36, terminating adjacent to the end face of the part 20. The two outer alignment grooves have exposed lengths at least as long as the projecting lengths of pins 30 and 32. The V-grooves in surfaces 27 and 36 are very accurately formed, so that when these surfaces are in the same plane and the abutting end faces of blocks 18 and 20 are parallel, all the grooves in one block are exactly in alignment with the corresponding grooves in the other block.

Figure 3:
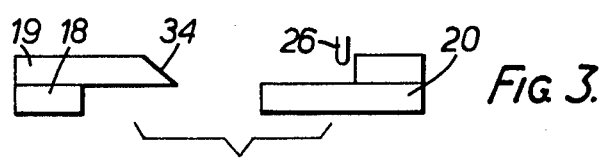
FIGS. 3, 4 and 5 illustrate schematically successive stages of making the connection.
Figure 4:
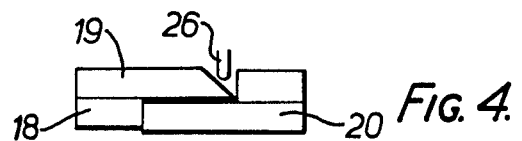
Figure 5:
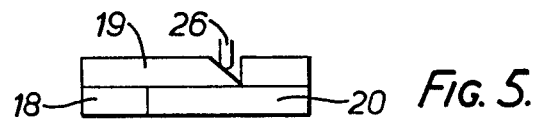

FIGS. 3, 4 and 5 illustrate the method of connecting the fibres, the fibres 10, 11, 12 and 13, the pins 30 and 32 and the housings 14 and 16 being ommitted for clarity. In FIG. 3 the blocks 18, 19 and 20 are apart, i.e. the blocks 18 or 19 have not yet entered the housing 14.

FIG. 4 shows the end of the first movement, the abutting end faces of blocks 18 and 20 at position X are in contact, the grooves in each block are roughly located by the housing 14 and the spigot 26 is in approximate contact with the inclined plane 34 on the block 19. As the blocks 18 or 19 are pushed further home the block 20 moves to the right against the spring 22, the abutting end faces of blocks 18 and 20 in contact. At the same time the block 18 is driven downwards by the action of the spigot 26 sliding on the inclined plane 34 on the block 19, and the alignment pins are pushed laterally into the grooves formed in the upper surface 36 of the block 20. Both the blocks 18 and 20 are forced downwards against the spring 24 until the block 20 strikes the interior of the housing 14. The blocks 18 and 19 are held in this position by the screwed cap 16 and a very positive locking is achieved with the surfaces 27 and 36 lying in the same plane and the ends of the fibres in contact or adjacent to each other.

Since the alignment pins do not slide in the grooves, scuffing does not occur, although wear may occur along the inclined plane 34 and the point of contact on spigot 26. This can be reduced by forming both contact surfaces from hard materials although wear can also be accomodated by the movement of both blocks 18 and 20 further to the right against the spring 22.

What is claimed is:

1. An optical fibre connector comprising a first member and a second member, each of said first and second members having a flat plane surface formed thereon and each said flat plane surface having a groove formed therein, first and second optical fibres, said first optical fibre being located in and extending along the full length of said groove formed in said flat plane surface of said first member, and said second optical fibre being located in and extending along the full length of said groove formed in said flat plane surface of said second member, a third member, said third member having a flat plane surface of greater area than that of said first member, said third member being mounted to clamp said first optical fibre in said groove, said first and second members abutting together with their flat plane surfaces lying in the same plane and said first and second optical fibres being in axial alignment with their ends abutting, and said flat plane surface of said third member overlapping said flat plane surface of said second member, a cam surface formed on said third member, said cam surface reacting with a fixed member to urge said third member towards said flat plane surface of said second member to clamp said second optical fibre in said groove, and resilient means for urging said first and second members together in an axial direction.

2. An optical fibre connector as claimed in claim 1 comprising a fourth member, said optical fibre mounted in said groove of said second member being clamped in position by said fourth member.

3. An optical fibre connector as claimed in claim 2 comprising a housing, said four members being mounted in said housing.

4. An optical fibre connector as claimed in claim 3, wherein said fixed member is secured inside said housing, whereby the cam surface of said third member reacts with said fixed member on axial movement of said third member within said housing.

5. An optical fibre connector as claimed in claim 4 wherein said second member is axially movable relative to said housing against said resilient means.

* * * * *